G. ULTSCH, Sr.
CORN PLANTER ATTACHMENT.
APPLICATION FILED SEPT. 8, 1916.
1,233,146.
Patented July 10, 1917.
2 SHEETS—SHEET 1.
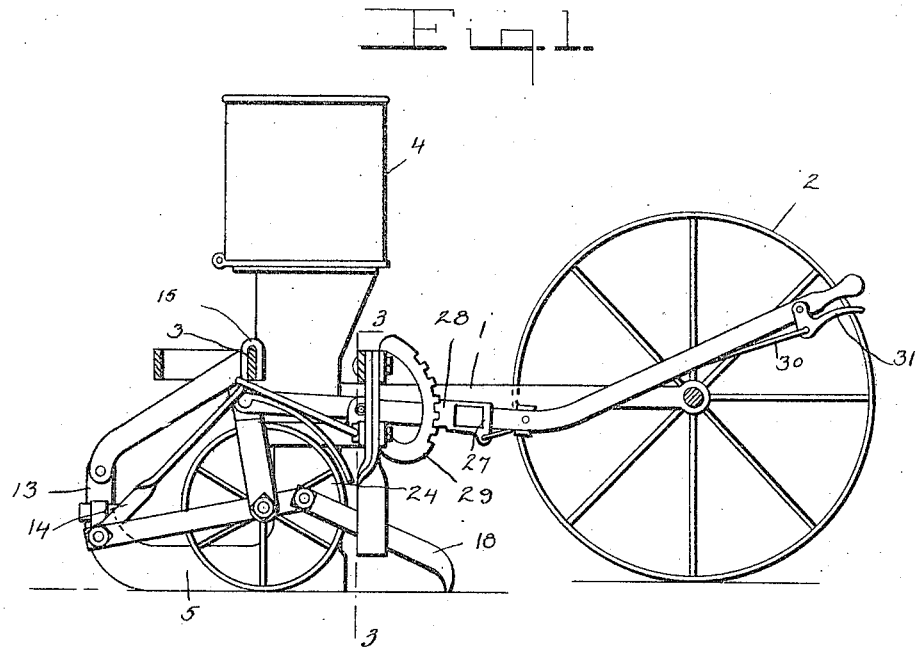
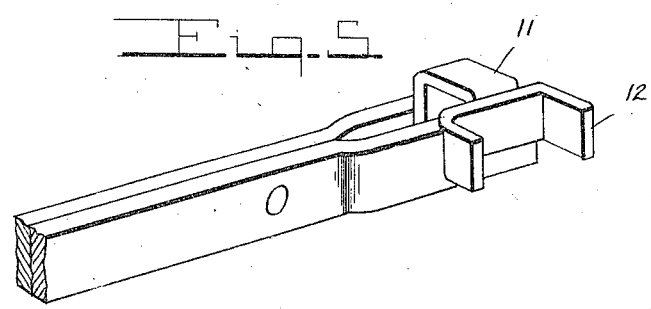
Witness
RM Jones
Wm F. Davidson
Inventor
G. Ultsch Sr.
By
Attorney

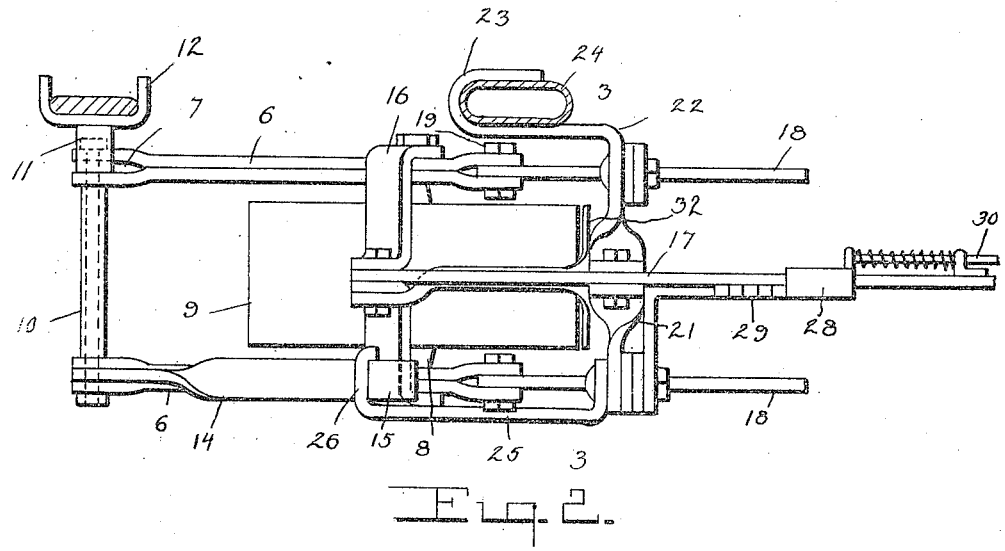
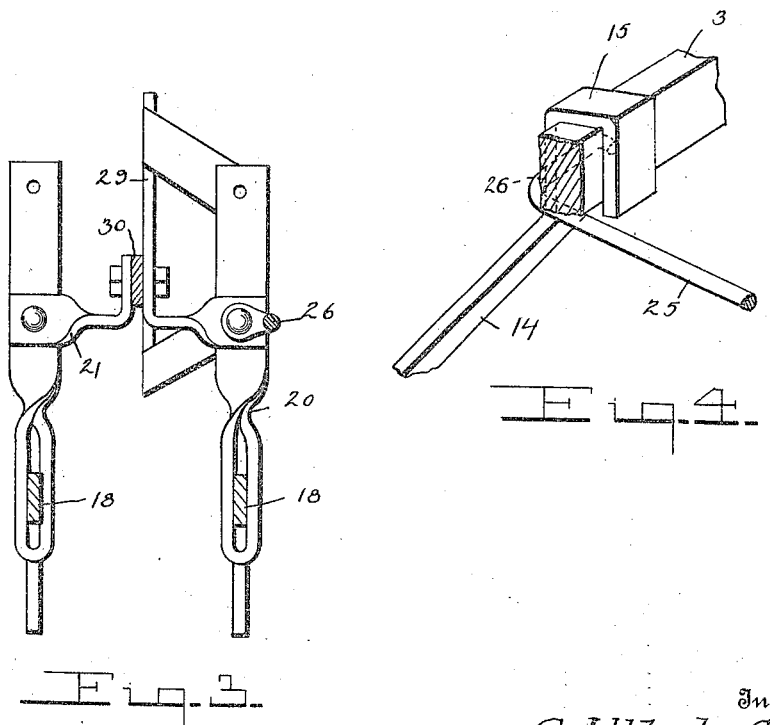

UNITED STATES PATENT OFFICE.

GEORG ULTSCH, SR., OF CASTANA, IOWA.

CORN-PLANTER ATTACHMENT.

1,233,146.  Specification of Letters Patent.  Patented July 10, 1917.

Application filed September 8, 1916. Serial No. 119,075.

*To all whom it may concern:*

Be it known that I, GEORG ULTSCH, Sr., a citizen of the United States, residing at Castana, in the county of Monona and State of Iowa, have invented certain new and useful Improvements in Corn-Planter Attachments; and I do hereby declare the following to be a full, clear, and exact description of the invention, such as will enable others skilled in the art to which it appertains to make and use the same.

This invention relates to a corn planter attachment and has for its primary object the provision of means for regulating the depth of planting corn and which will obviate the danger of planting corn too deep when passing over uneven ground.

Another object of this invention is to provide a frame connected to the furrowing shoe and to the planter frame and having a ground wheel thereon for maintaining the shoe at a correct height, whereby the danger of planting too shallow or too deep is obviated when passing over uneven ground.

A further object of this invention is to provide a lever connected to the frame for raising and lowering the wheel, whereby the depth of the furrow being made by the shoe may be regulated.

A still further object of this invention is the provision of a corn planter attachment of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a longitudinal sectional view of a corn planter, illustrating my invention applied thereto, Fig. 2 is a top plan view of a corn planter attachment, constructed in accordance with my invention, Fig. 3 is a transverse sectional view taken on the line 3—3 of Fig. 1, Fig. 4 is a detail perspective view of the means for securing the frame to the frame of the planter, and Fig. 5 is a detail perspective view of a clamp for securing the frame of the attachment to the shank of the shoe.

Referring in detail to the drawings, the numeral 1 indicates a frame of a corn planter having journaled thereon ground wheels 2. The frame 1 has the usual transverse members 3 and the hopper 4 having the usual furrowing shoe 5 for making a furrow in the ground and depositing corn received from the hopper 4 within the furrow. The foregoing description refers to a corn planter of the well known type and to which my invention is applied.

A pair of side bars 6 each constructed from two pieces of metal welded together and having their ends offset to form a fork as illustrated at 7. The bars 6 are connected together adjacent their rear ends by an axle 8 on which is journaled a wheel 9. A transverse rod 10 connects the forward ends of the bars 6 together as clearly illustrated in Fig. 2 and a substantially U-shaped member 11 is secured to the forward forked end 7 of one of the bars 6 and has secured thereto by means of a bolt a substantially U-shaped clamp 12. The U-shaped clamp 12 is adapted to surround the shank 13 of the shoe 5 as clearly illustrated in Fig. 1 and the bolt which holds the U-shaped clamp 12 to the U-shaped member 11 is passed through the shank 13 of the shoe 5 for retaining the U-shaped clamp 12 thereon.

An arm 14 is pivoted to the forward end or forked end 7 of one of the bars 6 and extends upwardly and rearwardly and has its free end bent to form a hook 15 for an engagement with one of the transverse members 3 of the frame 1 of the cultivator for supporting the forward end of the supporting bars 6. A pair of substantially L-shaped arms 16 are secured to each end of the axle 8 and extend in a substantially vertical plane therefrom and overlying the upper periphery of the wheel 9. The free ends of the L-shaped arms 16 are bolted or otherwise secured together and have pivotally connected thereto an operating lever 17 which extends rearwardly therefrom. A pair of guide arms 18 are pivotally secured to the rear ends of the supporting bars 6 by means of bolts 19 and are slidably received by the lower ends of a pair of vertical supporting arms 20, one of which has bolted or otherwise secured thereto an L-shaped bracket 21 which is bolted or otherwise pivotally secured to the lever 17. A securing arm 22 is bolted or otherwise secured to the other vertical supporting member 20 and is pivotally connected to the lever 17 and has its opposite end bent to form a hook 23 which engages the rear shank 24 of the shoe 5. A rod 25 is bolted or otherwise secured to the L-shaped bracket 21 and extends forwardly and upwardly and has its free end bent to form a hook 26 which engages the hook 15 of the arm 14. The rod 25 passing under the transverse bar 3 of the frame 1 will prevent the hook 15 of the arm 14 from disengaging therefrom.

A collar 27 is slidable upon the lever and has formed thereon a plurality of teeth 28 for an engagement with a rack segment 29 bolted or otherwise secured to one of the vertical supporting members 20. A rod 30 is connected to the collar 27 and to a hand grip 31 which is pivoted to the lever 30 for releasing the teeth 28 from an engagement with the rack segment when desired.

A suitable scraper 32 is bolted or otherwise secured to the L-shaped arm 16 and is adapted to engage the periphery of the wheel 9 to remove dirt and other foreign matter which may adhere thereon.

In operation, by raising and lowering the operating lever 17 the height of the wheel 9 will be regulated thereby regulating the depth of the furrow made by the shoe 5, obviating the danger of the shoe 5 cutting or plowing too deep a furrow when passing over uneven ground, as the wheel 9 will engage the uneven ground and prevent the shoe 5 from plowing too deep.

From the foregoing description taken in connection with the accompanying drawings, it will be noted that an attachment has been provided which may be readily and quickly applied to any corn planter without the use of skilled labor and which will efficiently regulate the depth which the corn should be planted under all conditions or when the corn planter is passing over uneven ground. The device may also be further employed for raising the shoe 5 from an engagement with the ground when desiring to move the corn planter from one point to another in an inoperative manner.

While I have shown and described the preferred embodiment of my invention, it will be understood that minor changes in construction, combination and arrangement of parts may be made without departing from the spirit and scope of the invention as claimed.

Having thus described my invention, what I claim is:—

1. In combination, a corn planter including a frame and a shoe, of an auxiliary frame, means for connecting the frame to the shoe and to the frame of the cultivator, a wheel journaled to the frame, and an operating lever pivoted to the frame and operatively connected to the wheel for raising and lowering the wheel in relation to the ground for governing the depth of the furrow made by the shoe.

2. In combination, a corn planter including a frame and a front shoe thereon, of a pair of supporting bars, means for connecting the forward ends of the bars together, means for connecting the bars to the shoe and to the frame, a wheel journaled to said bars adjacent the rear ends thereof, and means for raising and lowering the wheel to govern the depth of the furrow made by the shoe.

3. In combination, a corn planter including a frame and a shoe thereon, of a pair of relatively spaced supporting bars, a transverse rod connecting the forward ends of said bars together, a U-shaped clamp secured to one of the bars and to the shoe, an arm pivoted to the other bar and having its free end bent to form a hook to engage the frame, a wheel journaled to said bar, and means for raising and lowering the wheel.

4. In combination, a corn planter including a frame having a shoe thereon, of a pair of relatively spaced supporting bars, means for connecting the forward ends of the supporting bars together, a substantially U-shaped member secured to the forward end of one of said supporting bars, a U-shaped clamp secured to said U-shaped member and engaging the forward end of the shoe, an arm pivoted to the forward end of the other bar and having its free end bent to form a hook to engage the frame, a wheel journaled to the bars, L-shaped arms pivoted to the bars, an operating lever pivoted to the L-shaped arms, means for pivotally supporting the lever intermediate its ends to the frame.

5. In combination, a corn planter including a frame and a shoe thereon, of a pair of relatively spaced bars, means for securing the forward ends of the bars to the shoe, a wheel journaled to the rear end of the bars, L-shaped arms pivoted to the bars and overlying the periphery of the wheel, an operating lever pivoted to said L-shaped arms, a pair of guide arms pivoted to the rear ends of the bars, a pair of vertical supporting members slidably receiving said guide arms, means for connecting one of the vertical supporting members to the frame, means for connecting the other vertical supporting member to the shoe, and means for pivotally connecting the lever to the vertical supporting members.

6. In combination, a cultivator including a frame and a shoe, of a pair of relatively spaced bars, means for detachably securing the forward ends of the bars to the shoe, a wheel journaled to said bars, means for pivotally connecting an operating lever to the bars, guide arms pivoted to the rear ends of the bars, vertical supporting members slidably receiving said guide arms, an arm secured to one of the vertical supporting members and to the lever, said arm having its free end bent to form a hook to engage the shoe, a bracket secured to the other vertical supporting member and to the lever, and a rod bolted to one of the vertical supporting members and having its free end bent to form a hook for an engagement with the frame.

In testimony whereof I affix my signature in presence of two witnesses.

GEORG ULTSCH, Sr.

Witnesses:
W. J. DONLIN,
S. L. WILLITS, Jr.

Copies of this patent may be obtained for five cents each, by addressing the "Commissioner of Patents, Washington, D. C."